United States Patent
Frampton et al.

[15] 3,678,118
[45] July 18, 1972

[54] PROCESS FOR PREPARING ETHANOL

[72] Inventors: Orville D. Frampton, Wyoming; Julian Feldman, Cincinnati, both of Ohio

[73] Assignee: National Distillers and Chemical Corporation, New York, N.Y.

[22] Filed: Nov. 24, 1967

[21] Appl. No.: 685,272

[52] U.S. Cl. ................260/641, 252/469, 260/614 A, 260/643 B
[51] Int. Cl. ......................C07c 29/04, B01j 11/34
[58] Field of Search..................260/641; 252/469

[56] References Cited

UNITED STATES PATENTS

| | | |
|---|---|---|
| 2,755,309 | 7/1956 | Reynolds et al. ...............260/641 |
| 2,780,617 | 2/1957 | Zletz...............................252/469 |
| 3,006,970 | 10/1961 | Beuther et al. .................260/641 |
| 3,285,977 | 11/1966 | Henke et al.....................260/641 |
| 3,450,777 | 6/1969 | Mizutani et al.................260/641 |

FOREIGN PATENTS OR APPLICATIONS

| | | |
|---|---|---|
| 555,350 | 4/1958 | Canada............................260/641 |
| 1,228,603 | 11/1966 | Germany .......................260/638 A |

*Primary Examiner*—Leon Zitver
*Assistant Examiner*—Joseph E. Evans
*Attorney*—Allen A. Meyer, Jr.

[57] ABSTRACT

Ethanol is prepared by contacting ethylene and liquid water or an aqueous solution of an inert solvent with a catalytic amount of a prereduced catalyst consisting of a blue tungsten oxide on a zirconia support at 250°–350° C., 750–5,000 psi, and a mole ratio of water to ethylene of 5:1 to 25:1.

8 Claims, No Drawings

IMPROVED PROCESS FOR PREPARING ETHANOL

This invention relates to the liquid phase hydration of ethylene to produce ethanol. More particularly, this invention is concerned with an improved method for the hydration of ethylene in the presence of a novel catalyst.

It has previously been suggested in U.S. Pat. No. 1,907,317 that the catalytic hydration of olefins may be accomplished by the use of certain tungsten oxide catalysts. Moreover, the use of certain catalysts containing tungsten oxide in combination with oxide of titania (titanium oxide) for the catalytic hydration of olefins has been previously described in U.S. Pat. No. 2,755,309.

One object of this invention is to provide an improved method for the catalytic hydration of ethylene to ethanol.

Another object of this invention is to provide a novel catalyst for the liquid phase hydration of ethylene.

These and other objects of the invention will be apparent from the ensuing description and illustrative embodiments.

In general, the method of the invention provides for hydration of ethylene by contacting a mixture of the ethylene and liquid water or an aqueous solution of an inert solvent with a prereduced hydration catalyst containing a blue oxide of tungsten on a zirconia (zirconium oxide) support at elevated temperature under sufficient pressure to maintain an aqueous liquid phase.

The olefin hydration catalyst of this invention may be prepared by impregnating alkali metal ion-free zirconia with an aqueous solution of a compound containing tungsten, generally heating to remove free and bound water, and thereafter reducing the resultant mixture to obtain a blue tungsten oxide on zirconia catalyst. The zirconia can be hydrous zirconia and must be free of salts of sodium, potassium and lithium. It may be prepared from a zirconium tetrahalide, for example, zirconium tetrachloride, by the addition of aqueous ammonia to form the hydrous zirconia. The resulting ammonium halide, e.g. ammonium chloride, is then washed out and the resultant product is dried at about 120° C., and is then impregnated with a solution of a tungsten containing compound in a solvent.

Among the tungsten-containing compounds that may be employed in the practice of this invention are such compounds as ammonium metatungstate, ammonium paratungstate, silver tungstate, silicotungstic acid, zirconotungstic acid, paratungstic acid, and the ammonium salts thereof, and other like compounds. The solvent which may be employed in this procedure must be one in which the tungsten compound is soluble and includes such solvents as water, ether or other suitable solvents. The impregnated preparation may then be dried, and calcined in air at a temperature of about 400°–500° C. to convert the tungsten compound to tungsten oxide. The resulting tungsten oxide on zirconia product is then activated by reducing the tungsten oxide to a blue tungsten oxide as by heating with a reducing agent, e.g., hydrogen or alcohol, to a temperature sufficiently high to cause reduction, such as at 400°–500° C., for a period of from about 8 to 12 hours, to yield the improved catalyst of this invention.

In the preferred embodiment of the invention, the reduced catalyst is contained in a fixed bed in the form of pellets or extrudates where it can act on a mixture of ethylene and aqueous liquid which is caused to flow continuously through the bed. The system is held at a temperature sufficiently high to achieve activity in the catalyst, at a pressure as high as practicable for optimum ethylene solubility and at a mole ratio of water to ethylene sufficiently high at this operating pressure to maintain aqueous liquid phase. An increase in mole ratio results in increased amounts of liquid phase in the system. This allows for increased solution of alcohol from the vapor phase; however an economical optimum upper ratio limit exists since too high a ratio will result in excessive dilution of the alcohol. The product mixture taken from the reactor is cooled, and the unreacted ethylene together with ether is flashed off and recycled. Ethanol is recovered from the condensed aqueous product by distillation. If desired, the distilled ethanol product or the liquid phase from the reactor may be separated under process conditions of temperature and pressure, and then contacted with a hydrogenation catalyst and hydrogen in vapor or liquid phase to convert catalytically the by-products containing olefinic and/or carbonyl functions, such as crotonaldehyde, acetaldehyde, or the like, to saturated alcohols easily separable, e.g. by distillation. It is also possible to contact the reactants as a slurry with powdered hydration catalyst with the catalyst being retained in the reactor by means of a filter.

The hydration catalysts utilized herein consist essentially of about 5 to 40 percent blue tungsten oxide on a zirconia support which constitutes the remainder of the catalyst. Preferably, the composition contains from about 15 to 25 percent of the blue tungsten oxide and 75 to 85 percent zirconia.

The catalyst must be free of salts of alkali metals since these act as hydration catalyst poisons. The catalyst is prereduced, preferably with hydrogen at a temperature of about 400°–500° C. Alcohol vapor, i.e. ethanol, isopropanol, butanol, or the like, can also be effectively used to prereduce the catalyst.

Conditions of hydration should be such that there is always present a liquid phase into which water, ethylene and ethanol can dissolve. The liquid phase can be either water or an aqueous solution of an inert, relatively non-volatile or, where volatile, easily separable by distillation, liquid solvent. Various ketones, aldehydes, alcohols, nitriles, esters, amides, amino alcohols, phenols, triols, polyols, alcohol ethers, amines and organic acids may be employed as inert solvents. Examples of suitable solvents include ethylene glycol, hexylene glycol (2-methyl-2,4-pentane diol), dipropylene glycol, ethylene diamine, glyoxal, isopropyl alcohol, methyl cellosolve, morpholine, triethanolamine, acetone, acetic acid, formic acid, tert-butyl alcohol, acetonitrile, methyl ethyl ketone, ethyl acetate, and ethanol itself. Such a solvent achieves a higher solubility of the ethylene compared to water and at the same time dissolves the ethanol and by-product ether. These factors increase hydration rate, allow for use of lower pressures, and drive the hydration to high ethylene conversions. After the ethanol product alcohol has been separated from it, the selected solvent can be recycled. When ethanol itself is the selected solvent, only that amount of alcohol synthesized is taken as product and the remainder recycled.

Catalytic hydration with the above catalysts may be conducted over a wide range of conditions. Usually the temperature employed is within the range of about 250°–350° C., with a preferred range of about 290°–320° C. The pressure should be within the range of 750 to 5,000 psi and preferably should be between 4,000 and 4,500 psi. The mole ratio of water to ethylene is generally within the range of 5:1 to 25:1, and preferably from about 8:1 to 15:1.

This invention involves, therefore, the use of a novel non-corrosive, water insoluble, heterogeneous catalyst for the liquid phase hydration of ethylene to ethanol under certain controlled operating conditions.

The following examples will serve to illustrate the process of the invention:

EXAMPLE I

A. A blue tungsten oxide or zirconia catalyst was prepared by impregnating aqueous ammonium metatungstate on zirconia gel, drying, then calcining to give 21% $WO_3$ on zirconia. The calcined mixture was pelleted in the form of cylinders one-eighth inch long and one-eighth inch in diameter. These had a bulk density of 1.88 grams per cubic centimeter and an average side crushing strength of 6.4 pounds. The pellets were reduced at atmospheric pressure in a flowing stream of hydrogen gas at 400°–494° C. for 11 hours to give the active catalyst, blue tungsten oxide on zirconia.

B. 100 cubic centimeters of the blue tungsten oxide catalyst prepared in Example 1, Part A above, were placed in a 150 ml. three-quarter inch inside diameter jacketed pressure reactor equipped with thermocouple probes extending into the catalyst bed. Ethylene gas and liquid oxygen-free water were pumped continuously at 4,000 psi into the heated reactor through entry ports at the bottom of the reactor; the mole ratio of water to ethylene being about 11:1, and the water flow rate being 0.59 ml. per ml. catalyst per hour. The liquid-gas mixture continuously passed up through the catalyst bed at 320° C. during which time the hydration reaction occurred. The reaction product mixture was continuously removed from the reactor through an exit port at the top, cooled, then dropped to atmospheric pressure through a back pressure regulator designed to maintain reaction pressure constant (at 4,000 psi in this case) while allowing flow through. The liquid product was collected; the vapor product was condensed and collected in a receiver at −78° C. and non-condensible gas, principally unreacted ethylene, was passed through a wet test meter for measurement, then vented.

The hydration reaction was allowed to proceed 9.9 hours after which time gas-liquid chromatographic analyses were made of the products. The ethanol concentration was found to be 6.4 percent and calculations showed the space time yield of alcohol to be 0.042 grams ethanol per ml. catalyst per hour. The conversions of ethylene were found to be: 29 percent to ethanol, 4.8 percent to ethyl ether and 1.9 percent to polymer. The mass balance was 93 percent.

EXAMPLE II

The same catalyst and procedure used in Example I, part B, was used except that the reaction temperature was 312° C., the mole ratio of water to ethylene was 9:1, and the liquid water pumping rate was 1.1 ml. water per ml. catalyst per hour. The hydration reaction proceeded for 6.5 hours at which time the ethanol concentration in the liquid product was found to be 6.0 percent. The space time yield of ethanol was 0.068 grams ethanol per hour. The conversions of ethylene were: 22 percent to ethanol, 3.3 percent to ethyl ether, 1.2 percent to polymer. The mass balance was 98 percent.

EXAMPLE III

The same catalyst and procedure used in Example I, Part B, was used except that the reaction temperature was 330° C., the mole ratio of water to ethylene was 11:1 and the liquid water pumping rate was 1.9 ml. water per ml. catalyst per hour. The hydration reaction proceeded for 6.65 hours at which time the ethanol concentration in the liquid product was found to be 3.4 percent.

The space time yield of ethanol was 0.067 grams ethanol per ml. catalyst per hour. The conversions of ethylene were: 15 percent to ethanol, 0.9 percent to ether, 0.4 percent to polymer. The mass balance was 98 percent.

The above data show that the particular tungsten oxide catalyst of this invention can be effectively employed in hydration of ethylene to ethanol. The ability to use this catalyst in a liquid phase hydration is another important advantage, since other hydration catalysts could be employed in vapor phase operations only due to their excessive water solubility. It was also found that significantly lower catalyst losses resulting from leaching were encountered with the present catalyst as compared to a catalyst comprising blue tungsten oxide and titania.

While particular embodiments of this invention are shown above, it will be understood that the invention is obviously subject to variations and modifications without departing from its broader aspects.

What is claimed is:

1. A liquid phase process for converting ethylene to ethanol consisting essentially of contacting said ethylene and liquid water or an aqueous solution of an inert solvent with a catalytic amount of a prereduced catalyst consisting essentially of from about 5 to 40 percent of a blue tungsten oxide on a zirconia support, said zirconia being free of alkali metal ions, at a temperature within the range of about 250°–350° C., a pressure within the range of about 750–5,000 psi, and a mole ratio of water to ethylene within the range of about 5:1 to 25:1.

2. The process of claim 1 wherein the pressure is within the range of about 4,000–4,500 psi.

3. The process of claim 1 wherein the catalyst contains 20 per cent of the blue tungsten oxide and 80 percent of zirconia.

4. The process of claim 1 wherein the catalyst is prereduced with hydrogen gas at a temperature within the range of about 400°–500° C., for a period of from about 8 to 12 hours.

5. The process of claim 1 wherein the mole ratio of water to ethylene is within the range of about 8:1 to 15:1.

6. The process of claim 1 wherein the catalyst is placed in a fixed bed in the form of pellets or extrudates and the mixture of ethylene and liquid water flows continuously through said bed.

7. A liquid phase process for converting ethylene to ethanol consisting essentially of contacting said ethylene and liquid water, wherein the mole ratio of water to olefin is within the range of about 8:1 to 15:1, with a prereduced catalyst consisting essentially of about 15 to 25 percent of blue tungsten oxide and about 75 to 85 percent zirconia said zirconia being free of alkali metal ions, at a temperature within the range of about 290°–320° C., and a pressure within the range of about 4,000 to 4,500 psi. said catalyst having been prereduced by contacting it with hydrogen gas at a temperature within the range of about 400°–500° C., for a period of from about 8 to 12 hours.

8. The process of claim 7 wherein the catalyst contains about 20 percent of the blue tungsten oxide and about 80 percent of zirconia.

* * * * *